(12) United States Patent
Togawa et al.

(10) Patent No.: US 9,160,404 B2
(45) Date of Patent: Oct. 13, 2015

(54) REVERBERATION REDUCTION DEVICE AND REVERBERATION REDUCTION METHOD

(71) Applicant: FUJITSU LIMITED, Kawasaki (JP)

(72) Inventors: Taro Togawa, Kawasaki (JP); Takeshi Otani, Kawasaki (JP); Masanao Suzuki, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 291 days.

(21) Appl. No.: 13/674,479

(22) Filed: Nov. 12, 2012

(65) Prior Publication Data

US 2013/0188798 A1    Jul. 25, 2013

(30) Foreign Application Priority Data

Jan. 24, 2012   (JP) ................. 2012-011856

(51) Int. Cl.
*H04B 3/20*   (2006.01)
*G10L 21/0264*   (2013.01)
(Continued)

(52) U.S. Cl.
CPC .............. *H04B 3/20* (2013.01); *G10L 21/0264* (2013.01); *G10L 21/0232* (2013.01); *G10L 2021/02082* (2013.01)

(58) Field of Classification Search
CPC .......... H04R 1/2811; H04R 3/12; H04R 3/14; H04R 7/045; H04R 2499/11; H03F 3/68
USPC .......... 381/1, 26, 59, 63, 66, 71.1, 94.1, 94.2, 381/94.3, 104, 120
See application file for complete search history.

(56) References Cited

U.S. PATENT DOCUMENTS 8,036,767 B2    10/2011   Soulodre
8,160,262 B2*   4/2012    Buck et al. .............. 381/66
(Continued)

FOREIGN PATENT DOCUMENTS

JP    2000-69141    3/2000
JP    2004-226656   8/2004
(Continued)

OTHER PUBLICATIONS

Extended European Search Report issued Jul. 12, 2013 in corresponding European Application No. 12192177.9.

(Continued)

*Primary Examiner* — Vivian Chin
*Assistant Examiner* — William A Jerez Lora
(74) *Attorney, Agent, or Firm* — Staas & Halsey LLP

(57) ABSTRACT

A reverberation reduction device includes, a processor; and a memory which stores a plurality of instructions, which when executed by the processor, cause the processor to execute, calculating reverberation characteristics in response to an impulse response of a path of a sound from an audio output unit to an audio input unit by determining the impulse response from a first audio signal and a second audio signal that represents a sound that the audio input unit has picked up from the first audio signal reproduced by the audio output unit, and estimating a distance from the audio input unit to a sound source in accordance with at least one of a volume and a frequency characteristic of a third audio signal that represents a sound that the audio input unit has picked up from a sound from the sound source; correcting the reverberation characteristics so that the reverberation characteristics.

19 Claims, 11 Drawing Sheets

(51) Int. Cl.
*G10L 21/0208* (2013.01)
*G10L 21/0232* (2013.01)

(56) References Cited

U.S. PATENT DOCUMENTS

| | | | |
|---|---|---|---|
| 2004/0141418 | A1 | 7/2004 | Matsuo et al. |
| 2008/0199152 | A1* | 8/2008 | Namba et al. .................. 386/96 |
| 2008/0317260 | A1* | 12/2008 | Short .............................. 381/92 |
| 2011/0096631 | A1* | 4/2011 | Kondo et al. ................. 367/117 |

FOREIGN PATENT DOCUMENTS

| | | |
|---|---|---|
| JP | 2006-67127 | 3/2006 |
| JP | 2006-129434 | 5/2006 |
| JP | 2009-164747 | 7/2009 |
| JP | 2011-53062 | 3/2011 |
| WO | WO 01/35118 A1 | 5/2001 |

OTHER PUBLICATIONS

Patrick A. Naylor et al., "Speech Dereverberation", Internet Citation, Sep. 12, 2005, XP-002534598, pp. 1-4.

Japanese Office Action issued Jul. 14, 2015 in corresponding Japanese Patent Application No. 2012-011856.

* cited by examiner

FIG. 4

| Px(n) | -26dBov | -32dBov | -38dBov | -38 dBov OR LOWER | ~ 401 |
|---|---|---|---|---|---|
| rp(n) | >0dB | >-3dB | >-6dB | -6 dB OR LOWE | ~ 402 |
| ESTIMATED DISTANCE | 10cm | 20cm | 40cm | 60cm | ~ 403 |

~ 400

REVERBERATION REDUCTION DEVICE AND REVERBERATION REDUCTION METHOD

CROSS-REFERENCE TO RELATED APPLICATION(S)

This application is based upon and claims the benefit of priority of the prior Japanese Patent Application No. 2012-011856, filed on Jan. 24, 2012, the entire contents of which are incorporated herein by reference.

FIELD

The embodiments discussed herein are related to a reverberation reduction device and a reverberation reduction method that reduce a reverberation component included in an audio signal picked up by a microphone, and a computer-readable recording medium storing a reverberation reduction computer program.

BACKGROUND

A microphone may pick up a sound around the microphone arranged in a space surrounded by a sound-reflecting material. In such a case, a sound may directly reach the microphone from a sound source and another sound emitted from the sound source may indirectly reach the microphone after being reflected off the material at least once. The sound indirectly reaching the microphone is referred to as a reverberation sound. The timing at which the reverberation sound reaches the microphone is later than the timing at which the sound directly reaches the microphone. If a reverberation sound is present, the reverberation sound is superimposed on the sound having directly reached the microphone, and the resulting sound is difficult to hear. Recently, a cellular phone having water-tightness has been available. If such a cellular phone is used in a bath room where reverberation is likely to take place, the sound picked up by the cellular phone becomes very hard to listen to because of reverberation. Techniques of reducing the reverberation sound have been studied.

In a reverberation removal method disclosed in Japanese Laid-open Patent Publication No. 2006-67127, an impulse response of a feedback path formed by an acoustic coupling between a speaker and a microphone is adaptively identified by an adaptive filter, and an echo component of the feedback path is estimated from a reverberation audio signal picked up by the microphone. In the reverberation removal method, the estimated echo component is subtracted from an output signal of the feedback path, and a filter coefficient of the adaptive filter is updated in a manner such that an estimated error of the estimated value of the echo component is minimized. Furthermore in the reverberation removal method, the filter coefficient with the estimated error of the estimated value of the echo component minimized is substituted for the impulse response of a reverberation space. An original audio signal is thus determined by performing a computation operation on a transfer function of the reverberation space determined from the filter coefficient, and the reverberation audio signal picked up by the microphone.

In the technique disclosed in Japanese Laid-open Patent Publication No. 2006-67127, the reverberation characteristics of the sound emitted by the speaker and picked up by the microphone are used to approximate the reverberation characteristics of a sound emitted from the sound source and reaching the microphone. A user may talk using a handsfree function of the cellular phone. In such a case, a distance between the sound source and the microphone may become much longer than or much shorter than a distance between the speaker and the microphone. The reverberation characteristics of the sound emitted by the speaker and picked up by the microphone become distinctly different from the reverberation characteristics of the sound emitted from the mouth of the user and reaching the microphone. As a result, the reverberation component of the sound emitted from the sound source is not appropriately removed.

Techniques of estimating a distance to a sound source using a microphone array have also been disclosed. For example, Japanese Laid-open Patent Publication No. 2011-53062 discloses a sound source distance measurement device. The sound source distance measurement device respectively converts signals received by a plurality of microphones into signals in a in frequency domain, and vectorizes the signals in the frequency domain to calculate a space correlation matrix. The sound source distance measurement device determines power of a direct sound and power of a reverberation sound from the space correlation matrix and location information of the microphones, references a distance direct-indirect ratio database, and determines a sound source distance estimation value corresponding to a direct to indirect ratio. The direct to indirect ratio is determined by dividing the direct sound power by the reverberation sound power.

SUMMARY

According to an aspect of the embodiment, a reverberation reduction device includes, a processor; and a memory which stores a plurality of instructions, which when executed by the processor, cause the processor to execute, calculating reverberation characteristics in response to an impulse response of a path of a sound from an audio output unit to an audio input unit by determining the impulse response from a first audio signal and a second audio signal that represents a sound that the audio input unit has picked up from the first audio signal reproduced by the audio output unit, and estimating a distance from the audio input unit to a sound source in accordance with at least one of a volume and a frequency characteristic of a third audio signal that represents a sound that the audio input unit has picked up from a sound from the sound source; correcting the reverberation characteristics so that the reverberation characteristics become larger as the estimated distance becomes longer; and estimating a frequency spectrum of a reverberation component included in the third audio signal in response to the corrected reverberation characteristics; and attenuating the third audio signal more as a difference between the frequency spectrum of the third audio signal and the frequency spectrum of the reverberation component becomes smaller.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 4 illustrates a reference table indicating a relationship of input volume, low-frequency region power ratio, and distance;

DESCRIPTION OF EMBODIMENTS

Reverberation reduction devices of embodiments are described below with reference to the drawings. Using a sound picked up by a microphone from a reproduction sound output from a speaker, the reverberation reduction device approximately determines reverberation characteristics of an input sound emitted by the sound source and then picked up by the microphone. The reverberation reduction device determines a feature quantity of an input sound that varies in response to a distance from a sound source to a microphone, estimates the distance from the sound source to the microphone in accordance with the feature quantity, and corrects the reverberation characteristics in accordance with the estimated distance. The reverberation reduction device reduces a reverberation component included in the input sound in response to the corrected reverberation characteristics.

Figure 1:
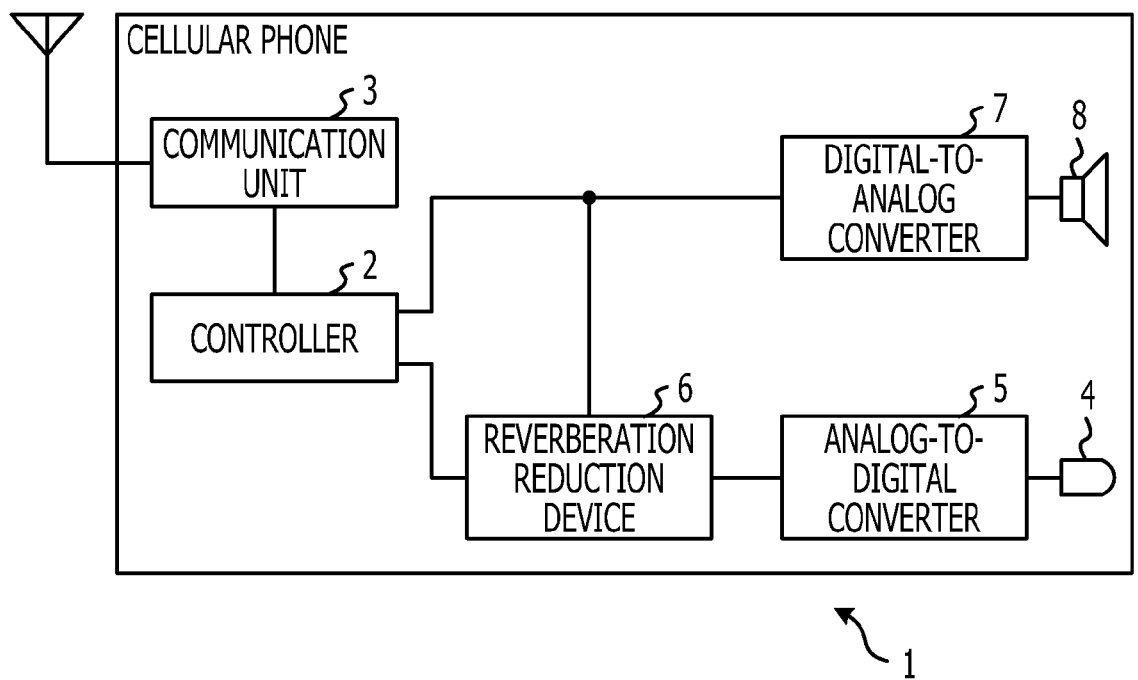
FIG. 1 diagrammatically illustrates a cellular phone with a reverberation reduction device of a first embodiment mounted thereon.

FIG. 1 diagrammatically illustrates a cellular phone 1 having the reverberation reduction device of a first embodiment mounted thereon. As illustrated in FIG. 1, the cellular phone 1 includes controller 2, communication unit 3, microphone 4, analog-to-digital converter 5, reverberation reduction device 6, digital-to-analog converter 7, and speaker 8.

The controller 2, the communication unit 3, and the reverberation reduction device 6 are designed as separate circuits. In one example, the circuits corresponding to these elements may be designed into a single integrated circuit and mounted on the cellular phone 1. In another example, each element may be a functional module that is implemented by a computer program running on a processor of the cellular phone 1.

The controller 2 includes at least one processor, a non-volatile memory, a volatile memory, and a peripheral circuit thereof. When a talk starts in response to an operation input on an operation unit (not illustrated) such as a keypad of the cellular phone 1, the controller 2 executes a call control process such as radio connection and radio disconnection between the cellular phone 1 and a basestation apparatus (not illustrated) in accordance with communication standards that the cellular phone 1 complies with. In response to results of the call control process, the controller 2 instructs the communication unit 3 to start or stop voice communication. The controller 2 retrieves an encoded audio signal included in a downlink signal received from the basestation apparatus via the communication unit 3, and decodes the audio signal. The controller 2 outputs as a reproduction audio signal the decoded audio signal to the reverberation reduction device 6 and the digital-to-analog converter 7.

The reverberation reduction device 6 generates and outputs an audio signal through reducing a reverberation component included in an input audio signal input via the microphone 4. The controller 2 encodes the output audio signal from the reverberation reduction device 6. The controller 2 thus generates an uplink signal including the encoded output audio signal. The controller 2 then transfers the uplink signal to the communication unit 3. The encoding methods for the audio signal may include adaptive multi-rate-narrowband (AMR-NB) or adaptive multi-rate-wideband (AMR-WB), standardized by third generation partnership project (3GPP).

The communication unit 3 radio communicates with the basestation apparatus. The communication unit 3 receives a radio signal from the basestation apparatus, and then converts the radio signal into a downlink signal on a baseband frequency. The communication unit 3 performs a reception process on the downlink signal, including separating, demodulating, and error-correction decoding the downlink signal, and then transfers the resulting downlink signal to the controller 2. The communication unit 3 also performs a transmission process on the uplink signal from the controller 2, including error-correction encoding, modulating, and multiplexing the uplink signal, then superimposes the resulting uplink signal on a carrier wave on a radio frequency, and then transmits the resulting radio wave to the basestation apparatus.

The microphone 4, serving as an example of an audio input unit, picks up a sound around the cellular phone 1 and generates an analog audio signal responsive to an intensity of the sound. The sound picked up by the microphone 4 is not limited to a direct sound that has directly reached the microphone 4 from a sound source, but includes a reverberation sound that results from a sound from the sound source that indirectly reaches the microphone 4 after being reflected off a surrounding wall around the cellular phone 1. The sound source is the mouth of a user who talks using the cellular phone 1, for example. The microphone 4 outputs the analog audio sound to the analog-to-digital converter 5.

The analog-to-digital converter 5 generates a digital input audio signal by sampling the analog audio signal received from the microphone 4 at a specific sampling pitch. The analog-to-digital converter 5, including an amplifier, may amplify the analog audio signal before digitizing the analog audio signal.

The analog-to-digital converter 5 outputs the input audio signal to the reverberation reduction device 6.

The reverberation reduction device 6 reduces the reverberation component included in the input audio signal. The reverberation reduction device 6 then outputs to the controller 2 the output audio sound having the reduced reverberation component. The reverberation reduction device 6 is described in detail below.

The digital-to-analog converter 7 digital-to-analog converts the reproduction audio signal received from the controller 2 into an analog signal. The digital-to-analog converter 7 may have an amplifier, and may amplify the analog reproduction audio signal. The digital-to-analog converter 7 then outputs the analog reproduction audio signal to a speaker 8.

The speaker 8 is an example of an audio output unit, and reproduces the reproduction audio signal received from the digital-to-analog converter 7.

The reverberation reduction device 6 is described in detail below.

Figure 2:
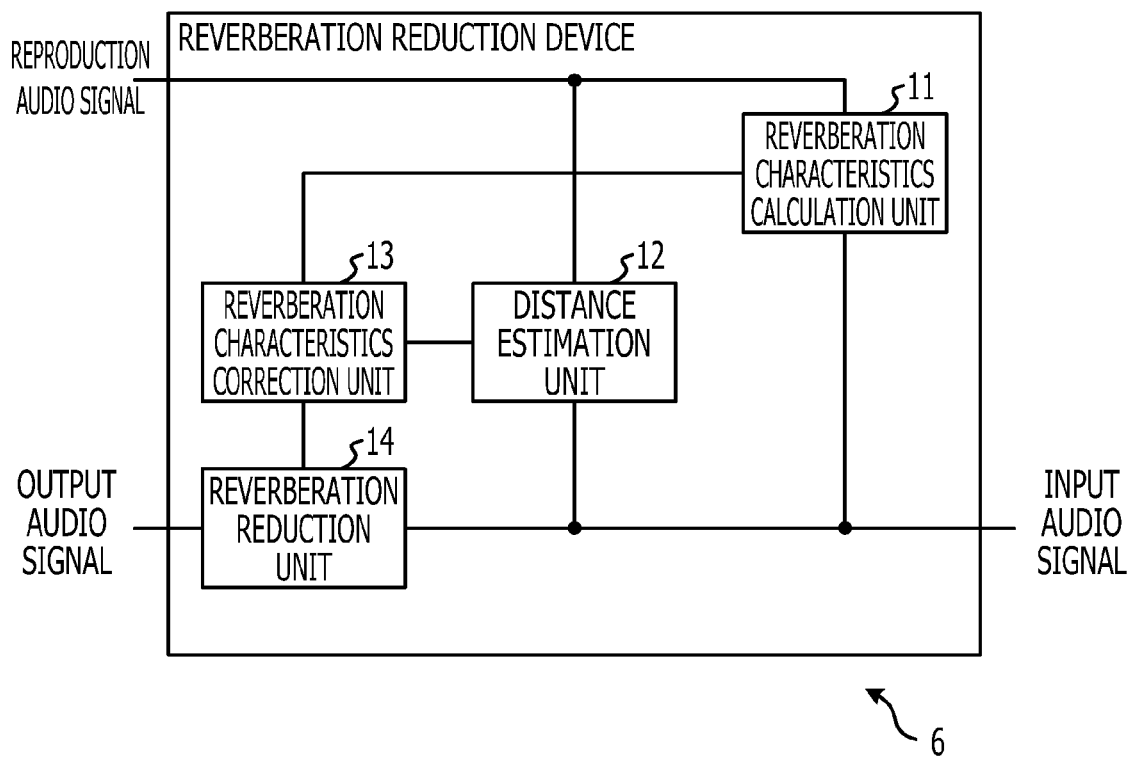
FIG. 2 diagrammatically illustrates the reverberation reduction device of the first embodiment.

FIG. 2 diagrammatically illustrates the reverberation reduction device 6 of a first embodiment. The reverberation reduction device 6 includes reverberation characteristics calculation unit 11, distance estimation unit 12, reverberation characteristics correction unit 13, and reverberation reduction unit 14.

The elements included in the reverberation reduction device 6 may be implemented as discrete elements on the reverberation reduction device 6, or may be implemented using a single integrated circuit having the functions of the elements.

The reverberation characteristics calculation unit 11 determines an impulse response of a path of a sound including a path from the speaker 8 to the microphone 4, in accordance with a reproduction audio signal and an input audio signal that the microphone 4 picks up when the speaker 8 reproduces the reproduction audio signal. In response to the impulse response, the reverberation characteristics calculation unit 11 determines an approximate value of the reverberation characteristics of a sound from the sound source external to the cellular phone 1.

According to the embodiment, the reverberation characteristics calculation unit 11 calculates the impulse response of the path of the sound through an adaptive filter of finite impulse response type. When the coefficient of the adaptive filer representing the impulse response is updated using least-square technique, the impulse response is calculated in accordance with the following expression:

$$e(t) = x(t) - w(t) * s(t)$$
$$w(t+1) = w(t) + \mu \cdot e(t) \cdot s(t) \quad (1)$$

where $s(t)$ represents a reproduction audio signal, $x(t)$ represents an input audio signal, $w(t)$ represents an impulse response of the path of the sound, and $e(t)$ represents an error signal. Also, coefficient $\mu$ represents a convergence coefficient that determines an update rate of the impulse response $w(t)$, and may be set to be 0.01 to 0.1. Operator "*" represents a convolution operation.

Figure 3:
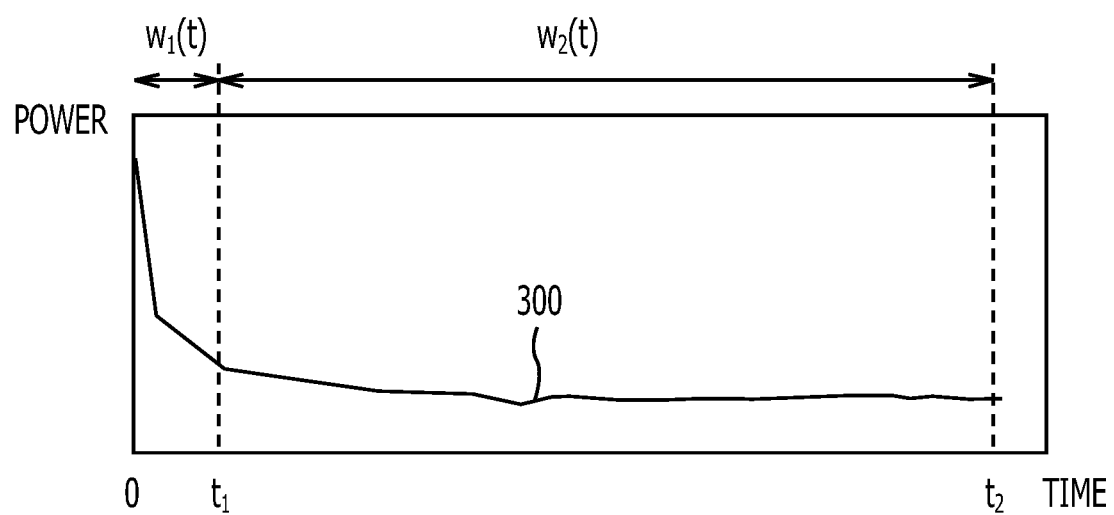
FIG. 3 illustrates an example of an impulse response of a path of a sound.

FIG. 3 illustrates an example of the impulse response of the path of the sound. In FIG. 3, the abscissa represents time that has elapsed since the sound entered the microphone 4, and the ordinate represents power of the sound. Plot 300 represents the impulse response $w(t)$. As represented by the plot 300, power of the sound sharply decreases from time 0 to time $t_1$. This portion corresponds to the impulse response of the path of the direct sound that has directly reached the microphone 4 from the sound source. In contrast, during a period from time $t_1$ to time $t_2$, power of the sound gradually decreases because the sound includes a reverberation sound that is emitted from the sound source, then is reflected off walls, and reaches the microphone 4. At time $t_2$, the reverberation sound almost disappears.

Time $t_1$ is experimentally determined beforehand as described below. A first impulse response $w(t)$ is determined in accordance with expression (1) when the cellular phone 1 is placed in an environment where almost no reverberation takes place. A second impulse response $w(t)$ is determined in accordance with expression (1) when the cellular phone 1 is placed in an environment where reverberation is likely to take place. First time at which the second impulse response $w(t)$ becomes larger than the first impulse response $w(t)$ is defined as time $t_1$. Time $t_2$ is experimentally determined as first time at which the second impulse response $w(t)$ becomes negligibly small. For example, $t_1 = 50$ ms, and time $t_2 = 400$ ms.

Concerning the component out of the impulse response down time $t_1$, the direct sound is predominant, but concerning the component from time $t_1$ thereafter, the reverberation sound is predominant. The reverberation characteristics calculation unit 11 thus sets a component $w_1(t)$ of the impulse response $w(t)$ from time 0 to time $t_1$ as a component of the direct sound, and a component $w_2(t)$ as a component of the reverberation sound. The reverberation characteristics calculation unit 11 time-frequency converts the component $w_1(t)$ of the direct sound and the component $w_2(t)$ of the reverberation sound, thereby determining the direct sound spectrum $W_1(f)$ and the reverberation sound spectrum $W_2(f)$. As a time-frequency conversion technique, the reverberation characteristics calculation unit 11 may use fast Fourier transform or modified discrete cosine transform.

The reverberation characteristics calculation unit 11 determines power $|W_1(f)|^2$ of the direct sound by summing the square of a real part of the direct sound spectrum $W_1(f)$ and the square of an imaginary part of the direct sound spectrum $W_1(f)$. Similarly, the reverberation characteristics calculation unit 11 determines power $|W_2(f)|^2$ of the reverberation sound by summing the square of a real part of the reverberation sound spectrum $W_2(f)$ and the square of an imaginary part of the reverberation sound spectrum $W_2(f)$. The reverberation characteristics calculation unit 11 calculates the reverberation characteristics $H(f)$ by calculating a ratio of the absolute value of an amplitude of the reverberation sound spectrum to the absolute value of an amplitude of the direct sound spectrum.

$$H(f) = \frac{|W_2(f)|}{|W_1(f)|} \quad (2)$$

The reverberation characteristics calculation unit 11 updates the reverberation characteristics $H(f)$ each time the reverberation characteristics calculation unit 11 updates the impulse response $w(t)$. The reverberation characteristics calculation unit 11 then outputs the reverberation characteristics $H(f)$ to the reverberation characteristics correction unit 13.

The distance estimation unit 12 estimates the distance from the microphone 4 to the sound source in accordance with at least one of a volume and a frequency characteristic of the input audio signal when the volume of the reproduction audio signal is negligibly small.

Generally, as the sound source is placed closer to the microphone, the power of the sound from the sound source picked up by the microphone becomes higher. The distance estimation unit 12 calculates the volume of the reproduction audio signal and the volume of the input audio power in accordance with the following expressions on each of the frames having a specific length.

$$Px(n) = 10 \cdot \log_{10}\left(\sum_{i=1}^{L-1} x(nL+i)^2\right) \quad (3)$$

$$Ps(n) = 10 \cdot \log_{10}\left(\sum_{i=1}^{L-1} s(nL+i)^2\right)$$

where L is the number of sampling points included in a single frame. The number of sampling points L may be set to be 128, 256, or 1024 for frames having lengths of 16 ms, 32 ms, and 64 ms. Here, n is an integer equal to or larger than 0, and represents the number of frames from the input start of the input audio signal. Let x(t) and s(t) represent the input audio signal and the reproduction audio signal, respectively. Let Px(n) and Ps(n) represent the volume of the input audio signal and the volume of the reproduction audio signal at frame n, respectively.

A microphone has the proximity effect. As the sound source is placed closer to the microphone, a ratio of the power of a low frequency component to the power of spectrum of the sound from the sound source picked up by the microphone becomes larger. The distance estimation unit 12 may estimate the distance from the microphone 4 to the sound source with reference to the power ratio.

To determine the power ratio, the distance estimation unit 12 converts the input audio signal to an input audio spectrum in a frequency domain on each frame. The distance estimation unit 12 calculates the input audio spectrum through time-frequency conversion such as fast Fourier transform or modified discrete cosine transform.

The distance estimation unit 12 calculates a power spectrum of the entire frequency band of the input sound in response to the input audio spectrum in accordance with the following expression:

$$PX(n, f) = 10 \log_{10} |X(n, f)|^2 \quad (4)$$

where $X(n,f)$ represents an input audio spectrum of a n-th frame, $PX(n,f)$ represents a power spectrum of an input sound of the n-th frame, and f represents frequency.

The distance estimation unit 12 calculates a low-frequency power ratio rp(n), which is a ratio of an average value of the power spectrum of the input sound in a low-frequency band to an average of the power spectrum of the input sound in the entire frequency band. The distance estimation unit 12 calculates the low-frequency power ratio rp(n) in accordance with the following expression:

$$rp(n) = \frac{1}{m_{low}} \sum_{f=0}^{m_{low}-1} PX(n, f) - \frac{1}{M} \sum_{f=0}^{M-1} PX(n, f) \quad (5)$$

where M represents the total number of frequency bands, and $m_{low}$ represents an upper limit frequency band of the lower-frequency bands. For example, if the input audio spectrum is represented by 128 components of frequency bands (M=128), $m_{low}$ is set to be 16. If the input audio spectrum has a frequency component of 0 through 4 kHz, the low frequency band is 0-500 Hz. Here, $m_{low}$ is set to be an upper value of frequency corresponding to a frequency component of the input audio signal at which the proximity effect of the microphone 4 increases power of the input audio signal.

The distance estimation unit 12 determines on each frame whether volume Ps(n) of the reproduction audio signal is smaller than a volume threshold value Thp. If the volume Ps(n) of the reproduction audio signal is equal to or higher than the volume threshold value Thp, the distance estimation unit 12 does not estimate the distance from the microphone 4 to the sound source. In this way, the distance estimation unit 12 controls an increase in the error of the estimated distance from the microphone 4 to the sound source caused when the microphone 4 picks up the reproduction audio signal reproduced by the speaker 8.

If the volume Ps(n) of the reproduction audio signal is lower than the volume threshold value Thp, the distance estimation unit 12 references a reference table indicating the relationship of the volume Px(n) of the input audio signal, the low-frequency power ratio rp(n), and the distance from the microphone 4 to the sound source. In this way, the distance estimation unit 12 may estimate the distance from the microphone 4 to the sound source corresponding to the volume Px(n) of the input audio signal and the low-frequency power ratio rp(n) at a given frame. The volume threshold value Thp may be set to be the upper value of volume of the reproduction audio signal, at which the estimation of the distance to the sound source remains unaffected, if the reproduction audio signal output from the speaker 8 is input via the microphone 4. The volume threshold value Thp may be set to be −48 dBov, for example.

FIG. 4 illustrates a reference table 400 indicating the relationship of the input volume, the low-frequency power ratio, and the estimated distance. In the reference table 400, each cell in a top row 401 represents a range of value of the volume Px(n) of the input audio signal, and each cell in a second row 402 represents a range of value of the low-frequency power ratio rp(n). Each cell in a third row 403 represents the estimated distance from the microphone 4 to the sound source corresponding to the range of value of the volume Px(n) of the input audio signal and the range of value of the low-frequency power ratio rp(n) at the same column. The reference table 400 may be pre-stored on a non-volatile semiconductor memory of the distance estimation unit 12. For example, if the volume Px(n) of the input audio signal is −25 dBov, and the low-frequency power ratio rp(n) is 1 dB, the distance estimation unit 12 estimates the distance from the microphone 4 to the sound source at 10 cm by referencing the reference table 400. If the volume Px(n) of the input audio signal is −31 dBov, and the low-frequency power ratio rp(n) is −5 dB, the distance estimation unit 12 estimates the distance from the microphone 4 to the sound source at 40 cm by referencing the reference table 400.

If variations in the low-frequency power ratio caused by the proximity effect of the microphone 4 are large, the distance estimation unit 12 may estimate the distance from the microphone 4 to the sound source in accordance with the low-frequency power ratio only. In such a case, the distance estimation unit 12 estimates the distance from the microphone 4 to the sound source in accordance with the low-frequency power ratio by referencing a reference table. The reference table indicates the relationship of the lower-frequency power ratio and the distance from the microphone 4 to the sound source.

Each time the distance estimation unit 12 determines the estimated distance from the microphone 4 to the sound source, the distance estimation unit 12 notifies the reverberation characteristics correction unit 13 of the estimated distance.

The reverberation characteristics correction unit 13 corrects the reverberation characteristics in response to the distance from the microphone 4 to the sound source.

Figure 5A:
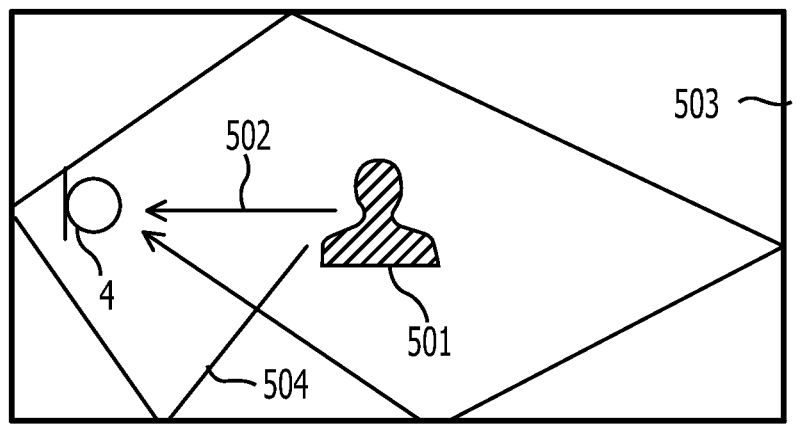
FIGS. 5A and 5B illustrate an example of a path of a sound traveling from a sound source to a microphone.
Figure 5B:
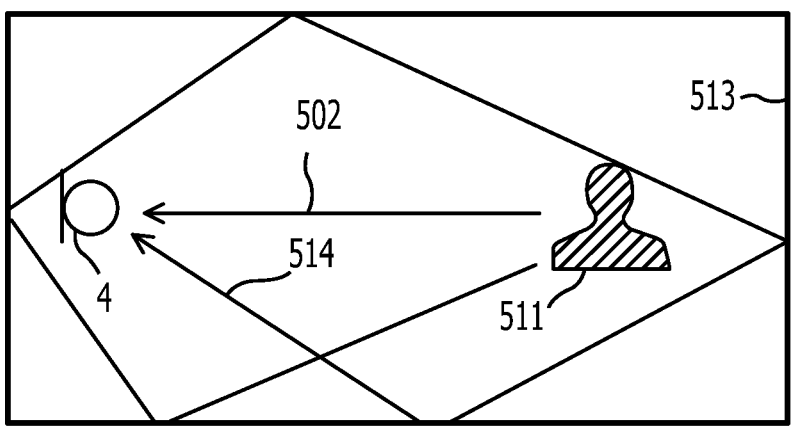

FIGS. 5A and 5B illustrate an example of paths from the sound source to the microphone 4. In FIG. 5A, the distance of a path 502 of a sound emitted from a sound source 501 and reaching the microphone 4 is 0.1 m. If the border time $t_1$ between the component of the direct sound and the component of the reverberation sound, included in the impulse response of the path of the sound is 50 ms, the sound emitted from the sound source 501 travels by about 17 m before time $t_1$ because the speed of sound in air is about 340 m/s. The length of a path 504 of the reverberation sound emitted from the sound source 501, reflected off a wall surface 503 around the microphone 4 at least once, and then entering the microphone 4 is about 17.1 m.

As illustrated in FIG. 5B, the distance of a path 512 of a sound emitted from a sound source 511 and reaching the microphone 4 is 1 m. If the border time $t_1$ is 50 ms as above, the length of a path 514 of the reverberation sound emitted from the sound source 511, reflected off a wall surface 513 around the microphone 4 at least once, and then entering the microphone 4 is about 18 m.

Attenuation A of a sound, emitted from a point sound source, at a point spaced by a distance $r_1$ from the point sound source with respect to a sound emitted from the point sound source at a point spaced by distance $r_0$ ($r_1 > r_0$) is represented by the following expression:

$$A = -20 \cdot \log_{10}\left(\frac{r_1}{r_0}\right) \quad (6)$$

If the sound source is shifted from the position of FIG. 5A to the position of FIG. 5B, the direct sound reaching the microphone 4 is attenuated by −20 dB in accordance with expression (6).

On the other hand, the reverberation sound reaching the microphone 4 is attenuated by only −0.45 dB in accordance with expression (6) if the sound source is shifted from the position of FIG. 5A to the position of FIG. 5B.

The longer the distance from the microphone 4 to the sound source is, the larger the effect of reverberation of the reverberation component becomes.

The reverberation characteristics correction unit 13 corrects the reverberation characteristics so that the reverberation characteristics increase as the distance from the microphone 4 to the sound source becomes long.

The reverberation characteristics correction unit 13 determines a correction gain α. The correction gain α is a positive value and becomes smaller as the estimated distance from the microphone 4 to the sound source is longer. For example, a non-volatile semiconductor memory in the reverberation characteristics correction unit 13 pre-stores a coefficient of a relational expression that represents the relationship between the distance from the microphone 4 to the sound source and the correction gain α. The reverberation characteristics correction unit 13 determines the correction gain α responsive to the estimated distance in accordance with the relational expression. Alternatively, the non-volatile semiconductor memory in the reverberation characteristics correction unit 13 pre-stores a reference table that represents the relationship between the distance from the microphone 4 to the sound source and the correction gain α. The reverberation characteristics correction unit 13 then determines the correction gain α responsive to the estimated distance by referencing the reference table.

Figure 6A:
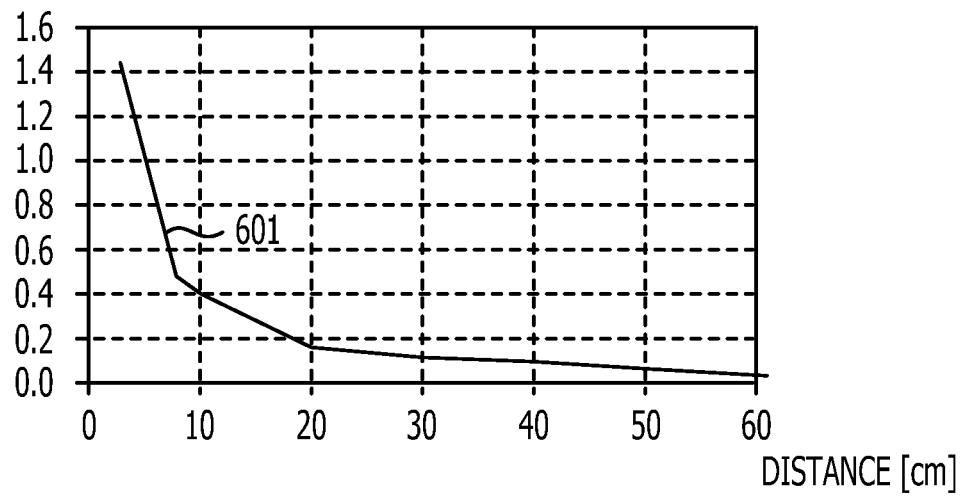
FIGS. 6A and 6B illustrate an example of a relationship between an estimated distance from the sound source to the microphone and a correction gain.
Figure 6B:
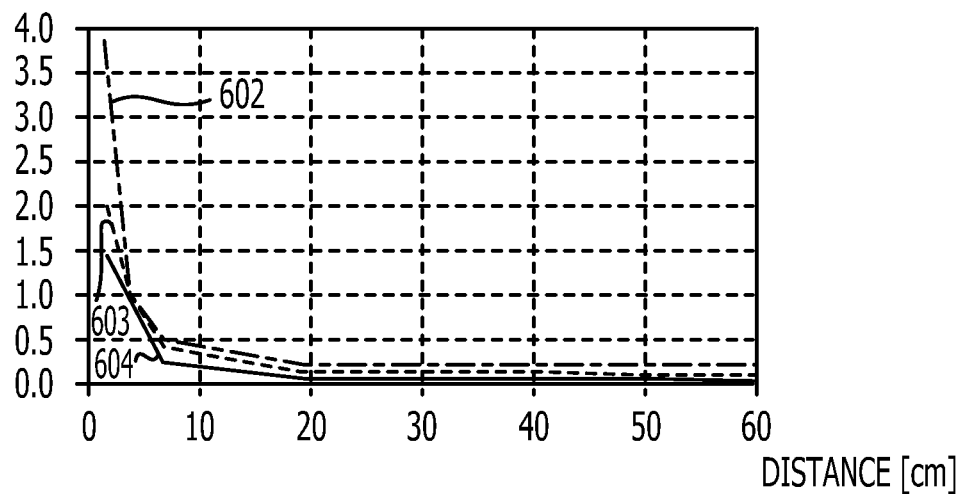

FIGS. 6A and 6B illustrate an example of the relationship between the distance from the microphone 4 to the sound source and the correction gain α. In FIG. 6A, the abscissa represents the estimated distance from the microphone 4 to the sound source, and the ordinate represents the value of the correction gain α. Plot 601 represents the value of the correction gain α with respect to the estimated distance. The correction gain α is determined so that the plot 601 monotonously decreases as the estimated distance increases.

FIG. 6B illustrates the relationship between the estimated distance and the correction gain α when the correction gain α is determined on each frequency band. In FIG. 6B, the abscissa represents the estimated distance from the microphone 4 to the sound source, and the ordinate represents the value of the correction gain α. Plots 602-604 respectively represent the values of the correction gains α with respect to the estimated distance on frequencies 50 Hz, 100 Hz, and 1 kHz. If the microphone 4 is close to the sound source, a low frequency component in the direct sound is increased, and the effect of the reverberation sound is decreased accordingly. As represented by the plots 602-604, the reverberation characteristics correction unit 13 increases the value of the correction gain α as frequency becomes low.

The reverberation characteristics correction unit 13 corrects the estimated reverberation characteristics in accordance with the following expression:

$$H'(f) = \frac{H(f)}{\alpha} = \frac{|W_2(f)|}{|W_1(f)| \cdot \alpha} \quad (7)$$

where H(f) is the reverberation characteristics estimated by the reverberation characteristics correction unit 13, H'(f) is the corrected reverberation characteristics, and α is a correction gain. Expression (7) indicates that the longer the estimated distance from the microphone 4 to the sound source is, and the smaller the correction gain α is, the larger the reverberation characteristics become.

The reverberation characteristics correction unit 13 may store, on a volatile memory or a non-volatile memory thereof, the determined correction gain α. The reverberation characteristics correction unit 13 may correct the reverberation characteristics using the stored correction gain α until the distance estimation unit 12 notifies the reverberation characteristics correction unit 13 of the next estimated distance, and the correction gain α is determined again.

The reverberation characteristics correction unit 13 outputs the corrected reverberation characteristics H'(f) to the reverberation reduction unit 14.

The reverberation reduction unit 14 reduces the reverberation component included in the input audio signal in accordance with the corrected reverberation characteristics H'(f) received from the reverberation characteristics correction unit 13.

The reverberation reduction unit 14 converts the input audio signal into an input audio spectrum in the frequency domain on a per frame basis. The reverberation reduction unit 14 may calculate the input audio spectrum through fast Fourier transform or modified discrete cosine transform as the distance estimation unit 12.

The reverberation reduction unit 14 then estimates a spectrum of the reverberation sound by multiplying the input audio spectrum by the corrected reverberation characteristics as follows:

$$R(n, f) = H'(f) \cdot X(n, f) \quad (8)$$

where X(n,f) is an input audio spectrum of an n-th frame, H'(f) is the corrected reverberation characteristics, and R(n,f) is the spectrum of the estimated reverberation sound of the n-th frame.

The reverberation reduction unit 14 determines a reduction gain G(f) representing an attenuation of the input audio spectrum in accordance with a difference value (δ(n,f)=X(n,f)−R(n,f)). The difference value (δ(n,f)=X(n,f)−R(n,f)) results from subtracting the spectrum of the estimated reverberation sound from the input audio spectrum. For example, the reverberation reduction unit 14 sets the reduction gain to be larger as the difference value δ(n,f) is smaller, i.e., the reverberation component in the input audio spectrum is larger.

Figure 7:
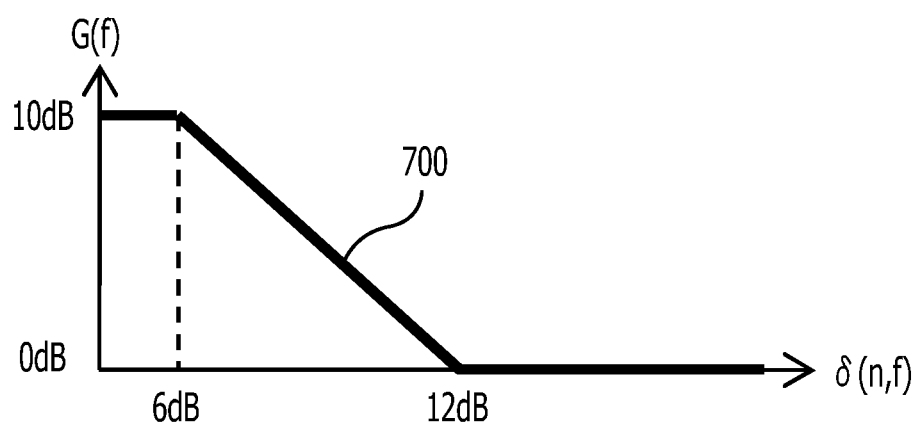
FIG. 7 illustrates an example of a relationship of a reduction gain to a difference between a power spectrum of an input sound and a reverberation spectrum.

FIG. 7 illustrates an example of the relationship of the reduction gain G(f) with the difference value δ(n,f) between the input audio spectrum and the spectrum of the reverberation sound. In FIG. 7, the abscissa represents the difference value δ(n,f) and the ordinate represents the reduction gain G(f). Plot 700 represents the relationship between the difference value δ(n,f) and the reduction gain G(f).

The plot 700 indicates that if the difference value δ(n,f) is 6 dB or lower, the reduction gain G(f) is set to be 10 dB. If the difference value δ(n,f) falls within a range from 6 dB to 12 dB, the reduction gain G(f) linearly decreases as the difference value δ(n,f) increases. If the difference value δ(n,f) is equal to or above 12 dB, the reduction gain G(f) is 0 dB, in other words, the reduction gain G(f) does not attenuate the input audio spectrum at all.

A coefficient of a relational expression representing the relationship between the difference value δ(n,f) and the reduction gain G(f) may be pre-stored on a non-volatile semiconductor memory of the reverberation reduction unit 14. In accordance with the relational expression, the reverberation reduction unit 14 determines the reduction gain G(f) responsive to the difference value δ(n,f). Alternatively, the reference table representing the relationship between the difference value δ(n,f) and the reduction gain G(f) may be stored on the non-volatile semiconductor memory of the reverberation reduction unit 14. Referencing the reference table, the reverberation reduction unit 14 determines the reduction gain G(f) responsive to the difference value δ(n,f).

In accordance with the following expression, the reverberation reduction unit 14 calculates an output audio spectrum that results from reducing the reverberation component from the input audio spectrum:

$$Y(n, f) = 10^{-G(f)/20} \cdot X(n,f) \quad (9)$$

where Y(n,f) is the output audio spectrum. From expression (9), the larger the reduction gain G(f) is, the smaller the output audio spectrum Y(n,f) is.

The reverberation reduction unit 14 obtains an output audio signal by converting the output audio spectrum Y(n,f) into a signal in the time domain through an inverse transform of the time-frequency transform used in the calculation of the input audio spectrum. The reverberation reduction unit 14 then outputs the output audio signal to the controller 2 in the cellular phone 1.

Figure 8:
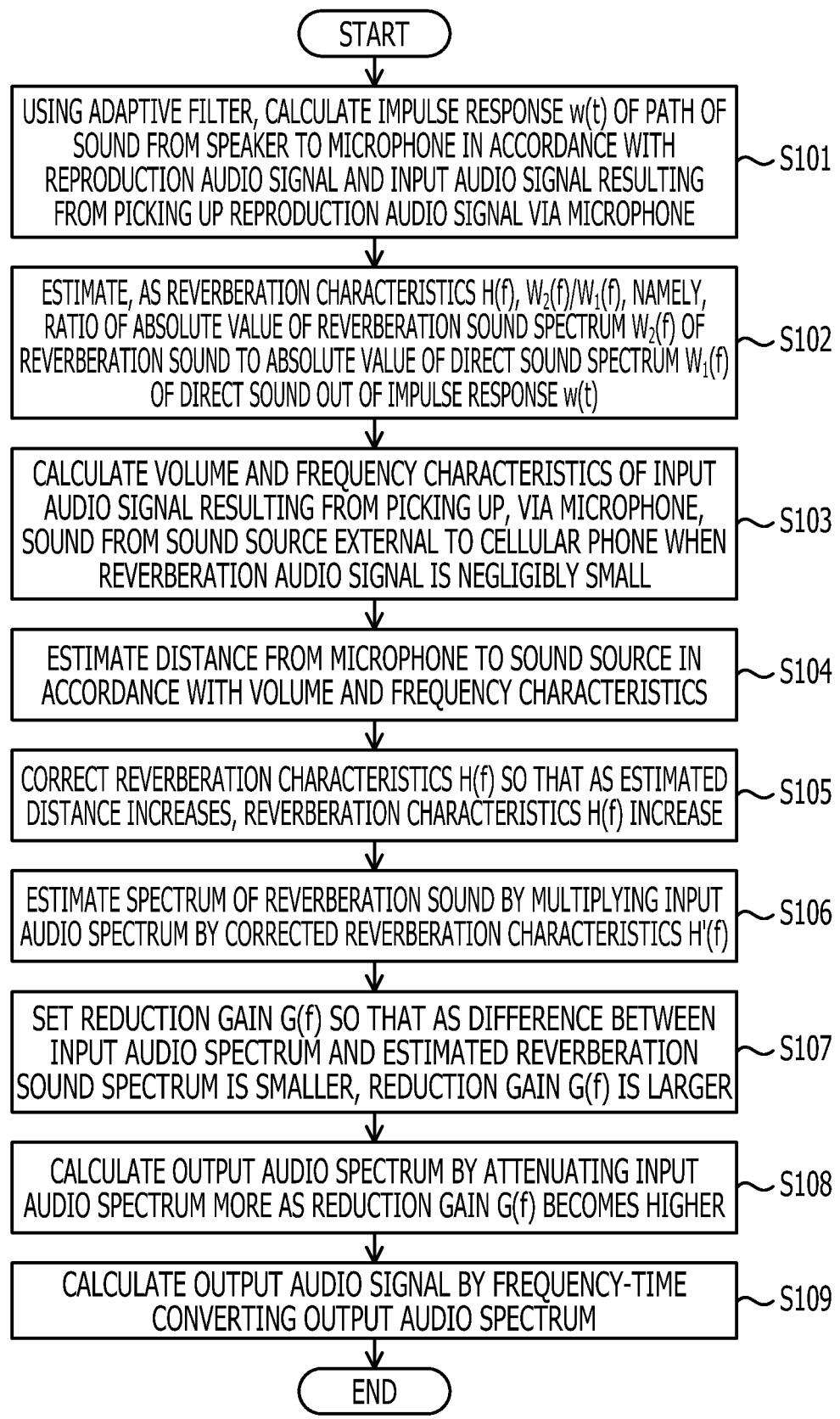
FIG. 8 is a flowchart illustrating a reverberation reduction process of the first embodiment.

FIG. 8 is a flowchart illustrating of a reverberation reduction process to be executed by the reverberation reduction device 6. Through the adaptive filter, the reverberation characteristics calculation unit 11 determines the impulse response w(t) of the path of the sound from the speaker 8 to the microphone 4 from the reproduction audio signal and the input audio spectrum obtained when the microphone 4 picks up the reproduction audio signal reproduced by the speaker 8 (step S101). The reverberation characteristics calculation unit 11 time-frequency converts the component corresponding to the direct sound and the component corresponding to the reverberation sound, out of the impulse response w(t), into the direct sound spectrum $W_1(f)$ and the reverberation sound spectrum $W_2(f)$, and estimates $|W_2(f)/W_1(f)|$, namely, the ratio of the absolute values of the reverberation sound spectrum $W_2(f)$ to the direct sound spectrum $W_1(f)$ (step S102). The reverberation characteristics calculation unit 11 outputs the reverberation characteristics H(f) to the reverberation characteristics correction unit 13.

The distance estimation unit 12 determines the volume and the frequency characteristic of the input audio signal that is obtained when the microphone 4 picks up the sound from the sound source external to the cellular phone 1 with the reproduction audio signal negligibly small (step S103). The distance estimation unit 12 estimates the distance from the microphone 4 to the sound source in accordance with the volume and the frequency characteristic (step S104). The distance estimation unit 12 notifies the reverberation characteristics correction unit 13 of the estimated distance.

The reverberation characteristics correction unit 13 corrects the reverberation characteristics H(f) so that the reverberation characteristics H(f) becomes larger as the estimated distance becomes longer (step S105). The reverberation characteristics correction unit 13 then outputs the corrected reverberation characteristics H'(f) to the reverberation reduction unit 14.

The reverberation reduction unit 14 determines the input audio spectrum by time-frequency converting the input audio signal, and estimates the spectrum of the reverberation sound by multiplying the input audio spectrum by the corrected reverberation characteristics H'(f) (step S106). The reverberation reduction unit 14 sets the reduction gain G(f) to be a larger value as the difference between the input audio spectrum and the reverberation sound spectrum is smaller (step S107). The reverberation reduction unit 14 calculates the output audio spectrum by attenuating the input audio spectrum more as the reduction gain G(f) is larger (step S108). The reverberation reduction unit 14 obtains the output audio signal by frequency-time converting the output audio spectrum (step S109). The reverberation reduction device 6 outputs the output audio signal, and thus completes the reverberation reduction process.

As described above, the reverberation reduction device estimates the distance from the microphone to the sound source, and corrects the reverberation characteristics approximately calculated from the reproduction audio signal in response to the estimated distance. Even if the distance from the microphone to the sound source changes, the reverberation reduction device appropriately determines the reverberation characteristics. The reverberation component in the input audio signal is thus reduced. Since the reverberation reduction device uses the volume and the frequency characteristic of the input audio signal to estimate the distance from the microphone to the sound source, the distance is estimated using only a single microphone.

A reverberation reduction device of a second embodiment is described below. The reverberation reduction device of the second embodiment receives information indicating whether a cellular phone having the reverberation reduction device mounted thereon is in a close-talking state or a handsfree state from a controller of the cellular phone. The reverberation reduction device estimates the distance from the microphone to the sound source with reference to a difference between the volume of the input audio signal in the close-talking state and the volume of the input audio signal in the handsfree state.

The reverberation reduction device of the second embodiment is different from the reverberation reduction device of the first embodiment in the process of the distance estimation unit 12. The following discussion focuses on the distance estimation unit 12. The remaining elements of the reverberation reduction device of the second embodiment are identical to the counterparts in the reverberation reduction device of the first embodiment, and reference is made to the previous discussion of the first embodiment. The following discussion is based on the premise that the reverberation reduction device of the second embodiment is mounted on the cellular phone 1 of FIG. 1.

When a talk starts in response to an operation input via the operation unit (not illustrated) of the cellular phone 1, such as the keypad or the touchpanel, the controller 2 in the cellular phone 1 notifies the reverberation reduction device 6 of talking distance setting information representing a talking distance setting at the start of the talk. The talking distance settings include a close-talking setting and a handsfree talking setting. In the close-talking setting, the volume of the sound output from the speaker 8 is so small that the user has difficulty in hearing the sound without placing the user's ear close to the speaker 8. The user is caused to talk with the microphone 4 put close to the user. On the other hand, in the handsfree talking setting, the volume of the sound output from the speaker 8 is large, and the user may communicate if the user is away from the cellular phone 1. There is a possibility that the distance between the user and the microphone 4 in the handsfree talking setting becomes longer than that in the close-talking setting.

If the operation unit switches between the close-talking setting and the handsfree talking setting, the controller 2 notifies the reverberation reduction device 6 of the talking distance setting information indicating the talking distance setting subsequent to the switching.

The distance estimation unit 12 calculates the volume of the input audio signal on each frame having a specific fixed length in accordance with expression (3) in the same manner as in the first embodiment.

The distance estimation unit 12 outputs, as the estimated distance from the microphone 4 to the sound source, a specific set value, for example, 5 cm to the reverberation characteristics correction unit 13 throughout a period in which the distance estimation unit 12 determines from the talking distance setting information from the controller 2 that the close-talking setting is selected. For example, the distance from the microphone 4 to the mouth of each of a plurality of users is measured during the close-talking setting, and then the average value of the distances is determined, and then pre-stored on the non-volatile semiconductor memory of the distance estimation unit 12.

The distance estimation unit 12 calculates the average volume of the input audio signal in the close-talking setting in accordance with expression (10) in a period throughout which the distance estimation unit 12 determines that the close-talking setting is selected. The average volume of the input audio signal in the close-taking setting is used as a reference value in the estimation of the distance from the distance from the microphone 4 to the sound source in the handsfree taking setting.

$$P_{ca}(n) = c \cdot Px(n) + (1-c) \cdot P_{ca}(n-1) \quad (10)$$

where $P_{ca}(n)$, and $P_{ca}(n-1)$ are respectively average volumes of the input audio signals in the close-taking setting at an n-th frame and an (n−1)-th frame. Px(n) is a volume of the input audio signal in the close-taking setting at the n-th frame, and c is a smoothing coefficient and may be set to be 0.01 to 0.1.

Each time the average volume of the input audio signal in the close-taking setting is updated, the distance estimation unit 12 stores the average volume on the semiconductor memory thereof.

The distance estimation unit 12 determines a volume difference Pd throughout a period in which the distance estimation unit 12 determines from the talking distance setting information from the controller 2 that the handsfree-talking setting is selected. The volume difference Pd results from subtracting the volume of the input audio signal at each frame from the average volume of the input audio signal in the close-talking setting. Referencing the reference table indicating the relationship between the volume difference Pd and the distance from the microphone 4 to the sound source, the distance estimation unit 12 determines the distance from the microphone 4 to the sound source responsive to the volume difference Pd. The reference table may be pre-stored on the non-volatile semiconductor memory of the distance estimation unit 12.

The distance estimation unit 12 outputs the estimated distance to the reverberation characteristics correction unit 13.

Figure 9:
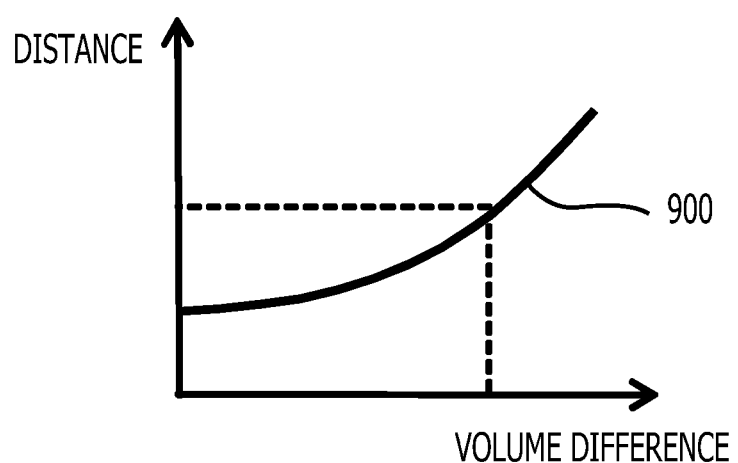
FIG. 9 illustrates an example of a relationship between a distance from the sound source to the microphone and a difference between an average volume in a close-talking mode and an input volume in an handsfree talking mode.

FIG. 9 illustrates an example of the relationship between the volume difference Pd and the distance from the microphone 4 to the sound source. In FIG. 9, the abscissa represents the volume difference Pd, and the ordinate represents the distance from the microphone 4 to the sound source. Plot 900 represents the relationship between the volume difference Pd and the estimated distance. The plot 900 indicates that the larger the volume difference Pd becomes, i.e., the smaller the volume of the input audio signal in the handsfree taking setting is with respect to the average volume of the input audio signal in the close-taking setting, the longer the estimated distance is.

Figure 10:
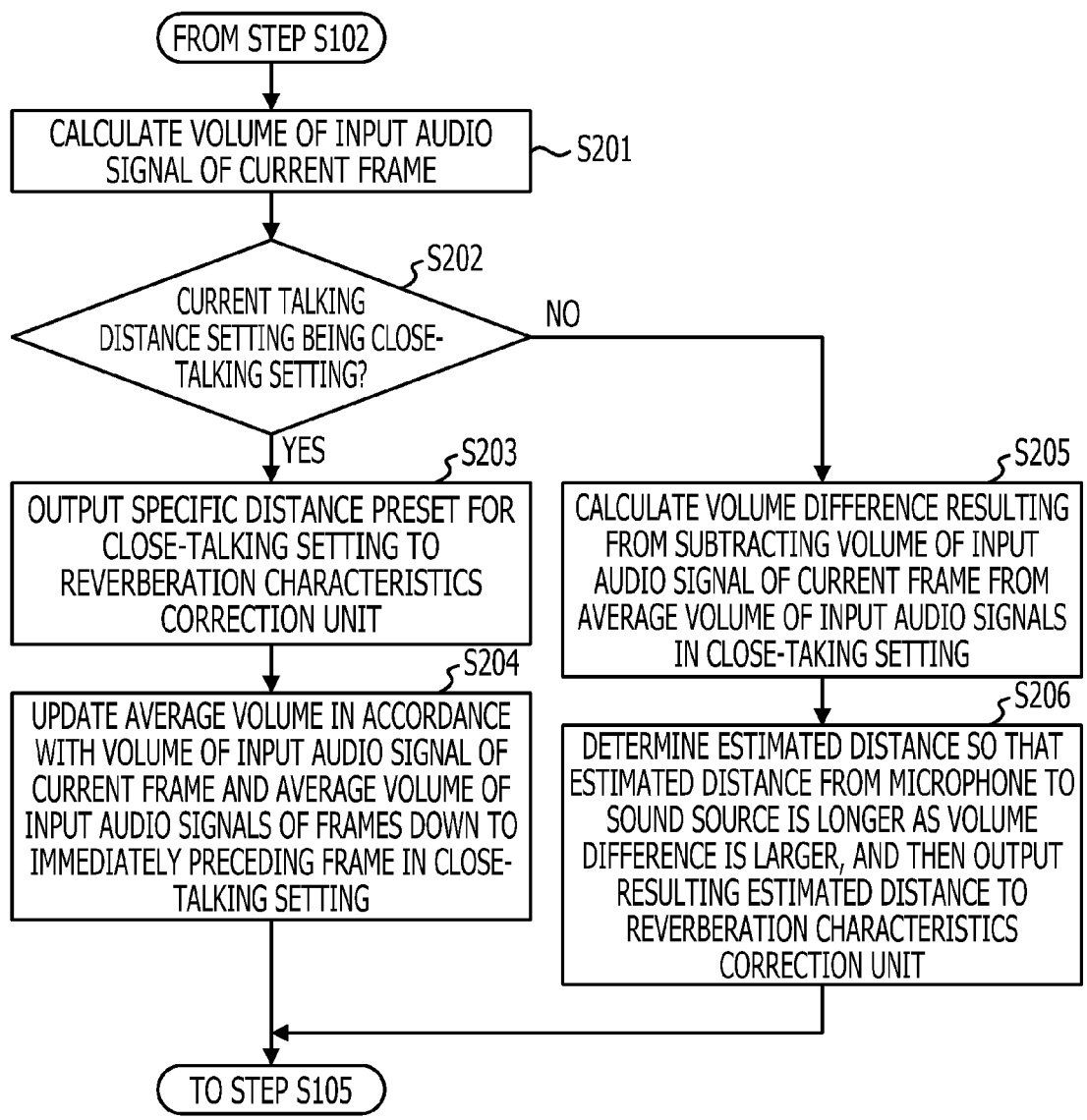
FIG. 10 is a flowchart illustrating a distance estimation process performed by a distance estimation unit in the reverberation reduction device of a second embodiment.

FIG. 10 is a flowchart illustrating a distance estimation process performed by the distance estimation unit 12. The distance estimation process is performed in place of steps S103 and S104 in the flowchart of FIG. 8.

The distance estimation unit 12 determines the volume of the input audio signal of the current frame (step S201). In response to the talking distance setting information received from the controller 2 in the cellular phone 1, the distance estimation unit 12 determines whether the talking distance setting is the close-talking setting (step S202). If the current talking distance setting is the close-talking setting (Yes from step S202), the distance estimation unit 12 outputs a specific distance set for the close-talking setting to the reverberation characteristics correction unit 13 (step S203). The distance estimation unit 12 updates the average volume in response to the volume of the input audio signal of the current frame and the average volume of the input audio signals of the frames down to the immediately preceding frame in the close-taking setting. The distance estimation unit 12 then stores the resulting average volume (step S204).

If the current talking distance setting is the handsfree talking setting (No from step S202), the distance estimation unit 12 determines the volume difference that results from subtracting the volume of the input audio signal of the current frame from the average volume of the input audio signals in the close-taking setting (step S205). The distance estimation unit 12 then references the reference table indicating the relationship between the volume difference and the distance from the microphone 4 to the sound source. The distance estimation unit 12 thus determines the estimated distance from the microphone 4 to the sound source corresponding to the volume difference determined in step S205, and then outputs the estimated distance to the reverberation characteristics correction unit 13 (step S206).

Subsequent to step S204 or step S206, the distance estimation unit 12 completes the distance estimation process.

The reverberation reduction device of the second embodiment estimates the distance from the microphone to the sound source in accordance with the difference between the average volume of the input audio signals in the close-taking setting and the volume of the input audio signal in the handsfree taking setting. The reverberation reduction device of the second embodiment may thus estimate the distance from the microphone to the sound source regardless of personal level difference in generated voice sounds of the users.

In one modification of the embodiments, the reverberation reduction device may include a time-frequency converter (not illustrated) separate from the distance estimation unit 12 and the reverberation reduction unit 14. The time-frequency converter calculates an input audio spectrum by time-frequency converting the input audio signal on a per frame basis. The input audio spectrum generated by the time-frequency converter on a per frame basis is input to the distance estimation unit 12 and the reverberation reduction unit 14. An amount of computation or the scale of the circuit for calculating the input audio spectrum may be reduced in this way.

In another modification, the reverberation characteristics calculation unit 11 calculates the volume of the reproduction audio signal in accordance with expression (3), and may then calculate the reverberation characteristics as long as the volume is equal to or larger than the volume threshold value Thp. In such a case, the reverberation reduction device 6 selectively perform steps S101 and S102 or steps S103 and S104 on a per frame basis in response to the volume of the reproduction audio signal in the flowchart of FIG. 8.

A computer program that causes a computer to perform the functions of the elements in the reverberation reduction device of each of the embodiments may be supplied in a recorded form on a computer-readable medium such as a magnetic recording medium or an optical recording medium.

Figure 11:
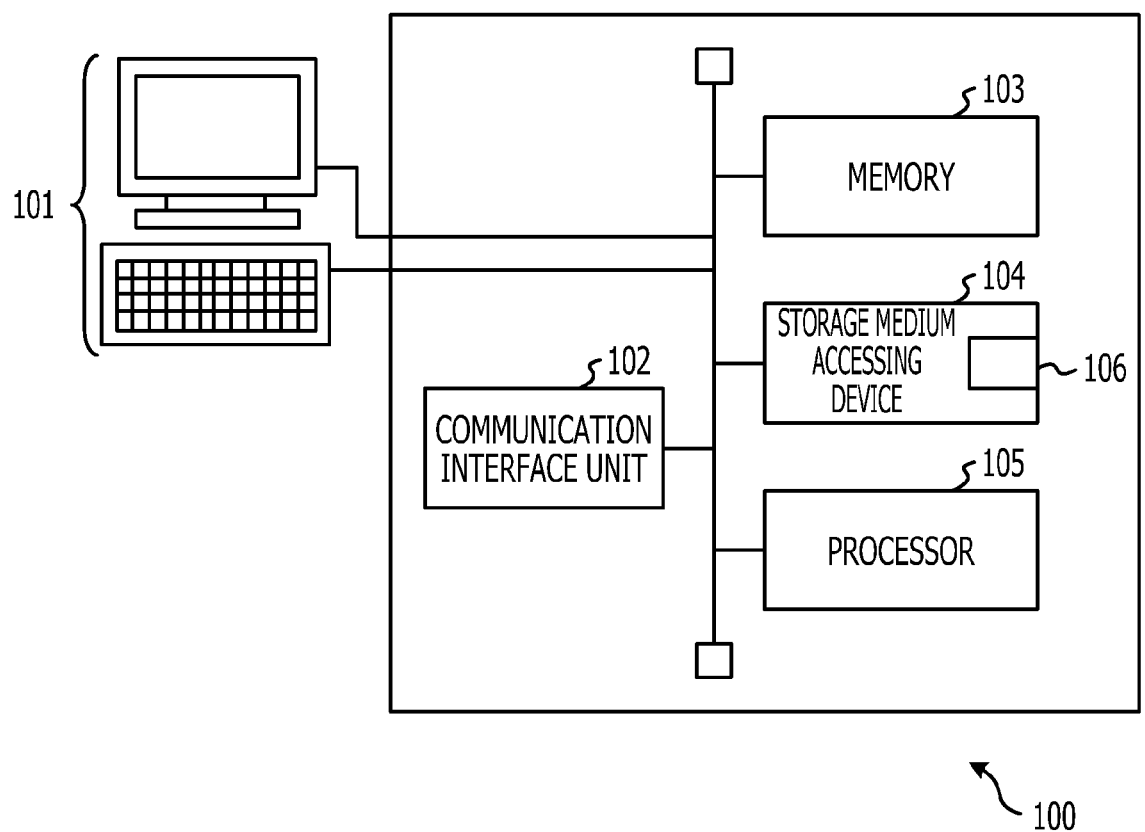
FIG. 11 illustrates a computer that operates as the reverberation reduction device when a computer program is run to implement functions of the reverberation reduction device in accordance with each embodiment and a modification thereof.

FIG. 11 illustrates a configuration of a computer 100 that operates as the reverberation reduction device when the computer program that causes the computer to perform the functions of the elements in the reverberation reduction device of each of the embodiments and the modifications thereof is run. The computer 100 includes user interface 101, communication interface 102, memory 103, storage medium accessing device 104, and processor 105. The processor 105 is connected to the user interface 101, the communication interface 102, the memory 103, and the storage medium accessing device 104 via a bus, for example.

The user interface 101 includes an input device including a keyboard and a mouse, and a display including a liquid-crystal display. The user interface 101 may include a device, such as a touchpanel display, into which the input device and the display are integrated. The user interface 101 outputs to the processor 105 an operation signal to start the reverberation reduction process in response to a user operation.

The communication interface 102 may include an audio interface circuit for connecting the computer 100 to the microphone and the speaker and a control circuit of the audio interface circuit.

The communication interface 102 may include a communication interface to connect the computer 100 to a communication network, such as Ethernet (registered trademark), complying with communication standards, and a control circuit of the communication interface.

The communication interface 102 acquires the reproduction audio signal from another apparatus connected to the communication interface, and then transfers the reproduction audio signal to the processor 105. The communication interface 102 may output the output audio signal with the reduced reverberation received from the processor 105 to the other apparatus via the communication network.

The memory 103 may includes a readable and rewritable semiconductor memory and a read-only semiconductor memory. The memory 103 stores a computer program that causes the processor 105 to perform the reverberation reduction process, and data including the reference table for use in the reverberation reduction process.

The storage medium accessing device 104 accesses a storage medium 106 such as a magnetic disk, a semiconductor memory card, or an optical storage medium. The storage medium accessing device 104 reads from the storage medium 106 the computer program of the reverberation reduction process performed on the processor 105, and then transfers the computer program to the processor 105.

The processor 105 executes the computer program for the reverberation reduction process of the embodiments and the modifications thereof, thereby reducing the reverberation component included in the audio signal input via the microphone. The processor 105 outputs the input audio signal with the reduced reverberation to another apparatus via the communication interface 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A reverberation reduction device comprising:
a processor; and
a memory which stores a plurality of instructions, which when executed by the processor, cause the processor to execute,
calculating reverberation characteristics in response to an impulse response of a path of a sound from an audio output unit to an audio input unit by determining the impulse response from a first audio signal and a second audio signal that represents a sound that the audio input unit has picked up from the first audio signal reproduced by the audio output unit,
estimating a distance from the audio input unit to a sound source in accordance with at least one of a volume and a frequency characteristic of a third audio signal that represents a sound that the audio input unit has picked up from a sound from the sound source;
correcting the reverberation characteristics so that the reverberation characteristics become larger as the estimated distance becomes longer; and
estimating a frequency spectrum of a reverberation component included in the third audio signal in response to the corrected reverberation characteristics; and
attenuating the third audio signal more as a difference between the frequency spectrum of the third audio signal and the frequency spectrum of the reverberation component becomes smaller.

2. The device according to claim 1,
wherein the calculating includes determining, as the reverberation characteristics, a ratio of a spectrum of a component of a period corresponding to a reverberation sound indirectly reaching the audio input unit from the audio output unit to a spectrum of a component of a period corresponding to a direct sound directly reaching the audio input unit from the audio output unit, included in the impulse response.

3. The device according to claim 1,
wherein the estimating of the distance includes calculating, as the frequency characteristic of the third audio signal, a ratio of a power spectrum of a frequency band equal to or lower than a specific frequency to a power spectrum of the entire frequency band of the third audio signal, and setting the estimated distance to be shorter as the ratio is higher.

4. The device according to claim 3, wherein the specific frequency is an upper limit of the frequency corresponding to a frequency component of the third audio signal at which the proximity effect of the audio input unit causes power of the third audio signal to increase.

5. The device according to claim 1, wherein the estimating of the distance includes calculating an average value of a volume of the third audio signal in a first period throughout which a device having the audio input unit is set in a close-talking mode, subtracting, from the average value, a volume of the third audio signal in a second period throughout which the device is not set in the close-talking mode, and increasing the estimated distance in the second period more as the difference between the volume of the third audio signal and the average value becomes larger.

6. The device according to claim 1, wherein the correcting includes setting a coefficient by which the reverberation characteristics at a first frequency are divided to be larger than a coefficient by which the reverberation characteristics at a second frequency higher than the first frequency are divided.

7. A reverberation reduction method comprising:
calculating, by a computer processor, reverberation characteristics in response to an impulse response of a path of a sound from an audio output unit to an audio input unit by determining the impulse response from a first audio signal and a second audio signal that represents a sound that the audio input unit has picked up from the first audio signal reproduced by the audio output unit,
estimating a distance from the audio input unit to a sound source in accordance with at least one of a volume and a frequency characteristic of a third audio signal that represents a sound that the audio input unit has picked up from a sound from the sound source;
correcting the reverberation characteristics so that the reverberation characteristics become larger as the estimated distance becomes longer; and
estimating a frequency spectrum of a reverberation component included in the third audio signal in response to the corrected reverberation characteristics; and
attenuating the third audio signal more as a difference between the frequency spectrum of the third audio signal and the frequency spectrum of the reverberation component becomes smaller.

8. The method according to claim 7, wherein the calculating includes determining, as the reverberation characteristics, a ratio of a spectrum of a component of a period corresponding to a reverberation sound indirectly reaching the audio input unit from the audio output unit to a spectrum of a component of a period corresponding to a direct sound directly reaching the audio input unit from the audio output unit, included in the impulse response.

9. The method according to claim 7, wherein the estimating of the distance includes calculating, as the frequency characteristic of the third audio signal, a ratio of a power spectrum of a frequency band equal to or lower than a specific frequency to a power spectrum of the entire frequency band of the third audio signal, and setting the estimated distance to be shorter as the ratio is higher.

10. The method according to claim 9, wherein the specific frequency is an upper limit of the frequency corresponding to a frequency component of the third audio signal at which the proximity effect of the audio input unit causes power of the third audio signal to increase.

11. The method according to claim 7, wherein the estimating of the distance includes calculating an average value of a volume of the third audio signal in a first period throughout which a device having the audio input unit is set in a close-talking mode, subtracting, from the average value, a volume of the third audio signal in a second period throughout which the device is not set in the close-talking mode, and increasing the estimated distance in the second period more as the difference between the volume of the third audio signal and the average value becomes larger.

12. The method according to claim 7, wherein the correcting includes setting a coefficient by which the reverberation characteristics at a first frequency are divided to be larger than a coefficient by which the reverberation characteristics at a second frequency higher than the first frequency are divided.

13. A non-transitory computer-readable storage medium storing a reverberation reduction processing program that causes a computer to execute a process, the process comprising:
calculating reverberation characteristics in response to an impulse response of a path of a sound from an audio output unit to an audio input unit by determining the impulse response from a first audio signal and a second audio signal that represents a sound that the audio input unit has picked up from the first audio signal reproduced by the audio output unit,
estimating a distance from the audio input unit to a sound source in accordance with at least one of a volume and a frequency characteristic of a third audio signal that represents a sound that the audio input unit has picked up from a sound from the sound source;
correcting the reverberation characteristics so that the reverberation characteristics become larger as the estimated distance becomes longer; and
estimating a frequency spectrum of a reverberation component included in the third audio signal in response to the corrected reverberation characteristics; and
attenuating the third audio signal more as a difference between the frequency spectrum of the third audio signal and the frequency spectrum of the reverberation component becomes smaller.

14. The non-transitory computer-readable storage medium according to claim 13, wherein the calculating includes determining, as the reverberation characteristics, a ratio of a spectrum of a component of a period corresponding to a reverberation sound indirectly reaching the audio input unit from the audio output unit to a spectrum of a component of a period corresponding to a direct sound directly reaching the audio input unit from the audio output unit, included in the impulse response.

15. The non-transitory computer-readable storage medium according to claim 13, wherein the estimating of the distance includes calculating, as the frequency characteristic of the third audio signal, a ratio of a power spectrum of a frequency band equal to or lower than a specific frequency to a power spectrum of the entire frequency band of the third audio signal, and setting the estimated distance to be shorter as the ratio is higher.

16. The non-transitory computer-readable storage medium according to claim 15,
    wherein the specific frequency is an upper limit of the frequency corresponding to a frequency component of the third audio signal at which the proximity effect of the audio input unit causes power of the third audio signal to increase.

17. The non-transitory computer-readable storage medium according to claim 13,
    wherein the estimating of the distance includes calculating an average value of a volume of the third audio signal in a first period throughout which a device having the audio input unit is set in a close-talking mode, subtracting, from the average value, a volume of the third audio signal in a second period throughout which the device is not set in the close-talking mode, and increasing the estimated distance in the second period more as the difference between the volume of the third audio signal and the average value becomes larger.

18. The non-transitory computer-readable storage medium according to claim 13,
    wherein the correcting includes setting a coefficient by which the reverberation characteristics at a first frequency are divided to be larger than a coefficient by which the reverberation characteristics at a second frequency higher than the first frequency are divided.

19. The device according to claim 1, wherein the attenuating includes determining a reduction gain that represents an attenuation of the third audio signal in accordance with a difference value that results from subtracting the estimated frequency spectrum of the reverberation component included in the third audio signal from a frequency spectrum of the third audio signal.

* * * * *